United States Patent [19]

Hartley et al.

[11] Patent Number: 4,610,192
[45] Date of Patent: Sep. 9, 1986

[54] RECIPROCABLE DEVICE

[75] Inventors: E. Dale Hartley, Malibu; F. Scott Hartley, Camarillo, both of Calif.

[73] Assignee: Product Research and Development, Anaheim, Calif.

[21] Appl. No.: 613,867

[22] Filed: May 23, 1984

Related U.S. Application Data

[63] Continuation-in-part of Ser. No. 443,589, Nov. 22, 1982.

[51] Int. Cl.[4] .............................................. F01L 31/02
[52] U.S. Cl. ..................................... 91/341 R; 91/346; 91/350; 137/15; 137/315; 403/335; 403/353
[58] Field of Search ................. 91/273, 327, 344, 345, 91/346, 352, 350, 398, 341 R; 137/329.01, 315, 15; 251/362; 403/335, 337, 338, 353

[56] References Cited

U.S. PATENT DOCUMENTS

| | | | |
|---|---|---|---|
| 274,879 | 3/1883 | Barton et al. | 91/273 |
| 956,225 | 4/1910 | Stowell | 91/273 |
| 1,205,857 | 11/1916 | Coffield | 91/273 |
| 1,309,724 | 7/1919 | Folberth | 91/273 |
| 1,912,203 | 5/1933 | Hueber et al. | 91/273 |
| 2,778,345 | 1/1957 | Dolza et al. | 91/344 |
| 2,869,515 | 1/1959 | Platzer | 91/273 |
| 2,979,067 | 4/1961 | Kern, Jr. et al. | 251/362 |
| 3,884,266 | 5/1975 | Kondo | 251/362 |
| 3,894,316 | 7/1975 | Johnson | 403/338 |
| 4,458,710 | 7/1984 | Weaver | 137/315 |

Primary Examiner—Robert E. Garrett
Assistant Examiner—Richard S. Meyer
Attorney, Agent, or Firm—Gordon L. Peterson

[57] ABSTRACT

A reciprocable device comprising a reciprocable member mounted for reciprocating movement within a chamber and a valve system for controlling the supply of fluid under pressure to the reciprocable member to bring about reciprocation of such member. The valve system includes first and second valve elements, a connector joining the valve elements and a bistable spring, which is actuated by the reciprocable member, for driving the connector.

20 Claims, 4 Drawing Figures

RECIPROCABLE DEVICE

CROSS REFERENCE TO RELATED APPLICATION

This application is a continuation-in-part of application Ser. No. 443,589 filed Nov. 22, 1982, entitled Valve System For A Reciprocating Device.

BACKGROUND OF THE INVENTION

Reciprocable devices typically include a reciprocable member which reciprocates to perform a useful function, such as pumping a flowable material, compressing a gas, metering a fluid or providing a reciprocating output for other purposes. A driving fluid under pressure, which may be either a liquid or a gas, is commonly used to reciprocate the reciprocable member. For example, the reciprocable member may be a piston having first and second faces which are alternately exposable to driving fluid under pressure and to exhaust.

A valve system is provided for controlling the exposure of the piston faces to the pressurized driving fluid and to exhaust. In order for the valve system to perform its function, the valve system typically includes one or more valve elements which must be moved periodically from one position to another to bring about reciprocation of the piston. Movement of the reciprocable member can be used to control movement of the valve elements.

Our prior application Ser. No. 443,589 filed on Nov. 22, 1982, entitled Valve System For A Reciprocating Device discloses a particularly advantageous system for utilizing the reciprocable member to control the valves. This is accomplished with minimum inertia and frictional losses. According to our prior application, bistable spring means, which includes pivotable levers, is drivingly coupled adjacent their respective end portions to first and second valve elements to drive these valve elements. Because the levers pivot, there is an angular relationship between the valve elements and the levers, and this can produce a tendency of the valve elements to cock or become inclined with respect to the desired direction of travel. Although this can be taken care of by utilizing appropriate spherical valve seats, it is desired to provide a more efficient manner of drivingly coupling the bistable spring means to the valve elements.

SUMMARY OF THE INVENTION

This invention provides a reciprocable device in which bistable spring means is advantageously and efficiently coupled to the valve elements. This is accomplished by using a connector to join the valve elements and drivingly coupling the bistable spring means and the connector. Preferably, the valve elements are movable in the same general direction along radially or laterally spaced paths for controlling the supply and exhaust of driving fluid under pressure to the reciprocable member. By using the bistable spring means to drive the connector, there is no tendency of the valve elements to become cocked or misaligned, and the driving force from the bistable spring means is efficiently coupled into the valve elements.

Due to tolerances, the valve elements may not engage their respective valve seats simultaneously. If the valve elements and connector formed a totally rigid structure, only the first valve element to engage its seat would be properly seated. To solve this problem and some misalignment problems, the connector is preferably coupled to at least one of the valve elements with some looseness to facilitate proper seating of the valve elements against their respective valve seats.

To facilitate seating of the valve element against the associated valve seat and to accommodate some misalignment, the surface of the valve element which engages the valve seat and the associated valve seat are preferably part spherical. These part-spherical surfaces have essentially the same radius and are essentially concentric when the valve element engages the valve seat.

Although the connector can take different forms, it preferably includes first and second plate-like members which extend generally transverse to the paths of movement of the valve elements. The plate-like members have openings sized and arranged to receive portions of the valve elements and to interlock therewith in such a way as to eliminate the need for any separate fasteners for joining the connector to the valve elements. Another advantage of this construction is that a system of stacked plate-like members is useful in absorbing shock loading to which the connector may be subjected.

Valve seat members are provided for each of the valve elements. Each of the valve seat members is preferably a tubular, resilient member which defines the valve seats for the valve elements. To facilitate rapid injection molding of the valve seat members, they are preferably integrally molded from a suitable plastic-rubber composite in which rubber particles are embedded in a plastic matrix. The resilience of the valve seat members is such that the valve elements can be assembled on the valve seat elements by forcing the valve elements through constructed portions of a passage through the associated valve seat member.

The bistable spring means can advantageously include first and second levers, a hinge member between the levers and spring means for urging the first and second levers toward the hinge member. The bistable spring means has first and second states and a neutral or center position, and the reciprocable member is used to drive the hinge member and the levers from each of its states toward the other of its states.

To drive the valve elements in one direction, the hinge member is preferably engageable with the connector. A coupling member is drivingly coupled to the hinge member for driving the connector and valve means in the other direction. The bistable spring means and the valve elements are preferably located at one end of the chamber in which the reciprocable member moves, and the hinge member is interposed between the connector and the reciprocable member. In this location, the hinge member can be easily driven by the reciprocable member and can be used to drive the connector.

The invention, together with additional features and advantages thereof, may best be understood by reference to the following description taken in connection with the accompanying illustrative drawing.

BRIEF DESCRIPTION OF THE PREFERRED EMBODIMENT

Figure 1:
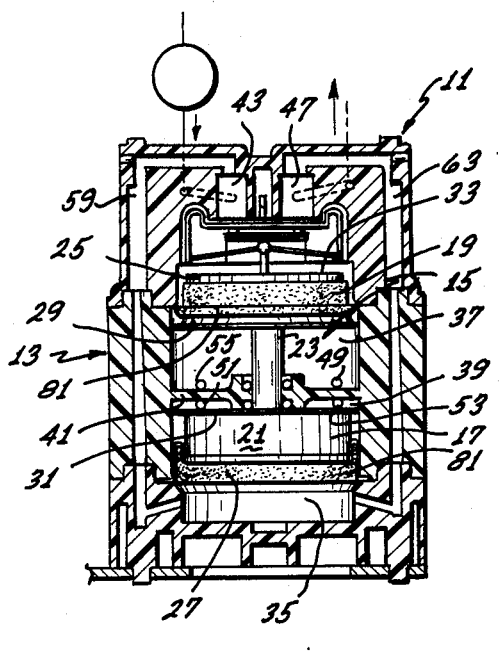
FIG. 1 is a schematic view of a reciprocable device constructed in accordance with the teachings of this invention.

FIG. 1 shows a reciprocable device 11 which includes wall means in the form of a housing 13 defining a chamber or cylinder 15 in which a reciprocable member in the form of a piston 17 is slidably mounted for reciprocating movement. In the form shown in FIG. 1, the reciprocable device 11 is a pump; however, the reciprocable device may be a compressor, meter or serve some other purpose. Although the reciprocable member can take different forms, such as a diaphragm, and the piston 17 can be of different constructions, in the form illustrated, it includes piston sections 19 and 21 joined together by a rod 23 and having driving faces 25 and 27 and pumping faces 29 and 31. With this arrangement, the chamber 15 is divided into driving chambers 33 and 35 at the opposite ends of the piston 17 and pumping chambers 37 and 39 between the piston sections 19 and 21 and a partition 41.

A supply valve 43 controls the supply of fluid under pressure from a source 45 to the driving chambers 33 and 35, and an exhaust valve 47 controls the exhausting of the driving chambers 33 and 35 to atmosphere or other place of reduced pressure. By appropriately operating the valves 43 and 47, the piston 17 is reciprocated in the chamber 15.

As the piston 17 moves downwardly (as viewed in FIG. 1), liquid in the pumping chamber 37 is forced through an outlet 49 and an outlet check valve (not shown) to a location where it is to be utilized and liquid is drawn in through an inlet check valve (not shown) and an inlet 51 into the pumping chamber 39. When the piston 17 reverses, the liquid in the pumping chamber 39 is forced through an outlet 53 and an outlet check valve (not shown), and liquid is drawn in to the pumping chamber 37 through an inlet check valve (not shown) and an inlet 55.

Except for the particular construction of the valves 43 and 47 and the manner in which they are operated, the construction shown in FIG. 1 may be conventional. FIG. 1 does, however, illustrate, by way of example, one form of reciprocable device in which the concepts of this invention may be embodied.

More specifically and with further reference to FIG. 1, the driving fluid under pressure can be supplied directly to the driving chamber 33 or through a supply passage section 59 to the driving chamber 35. Similarly, pressure in the driving chamber 33 can be exhausted directly through the exhaust valve, and pressure in the driving chamber 35 can be exhausted through the exhaust passage section 63.

Figure 2:
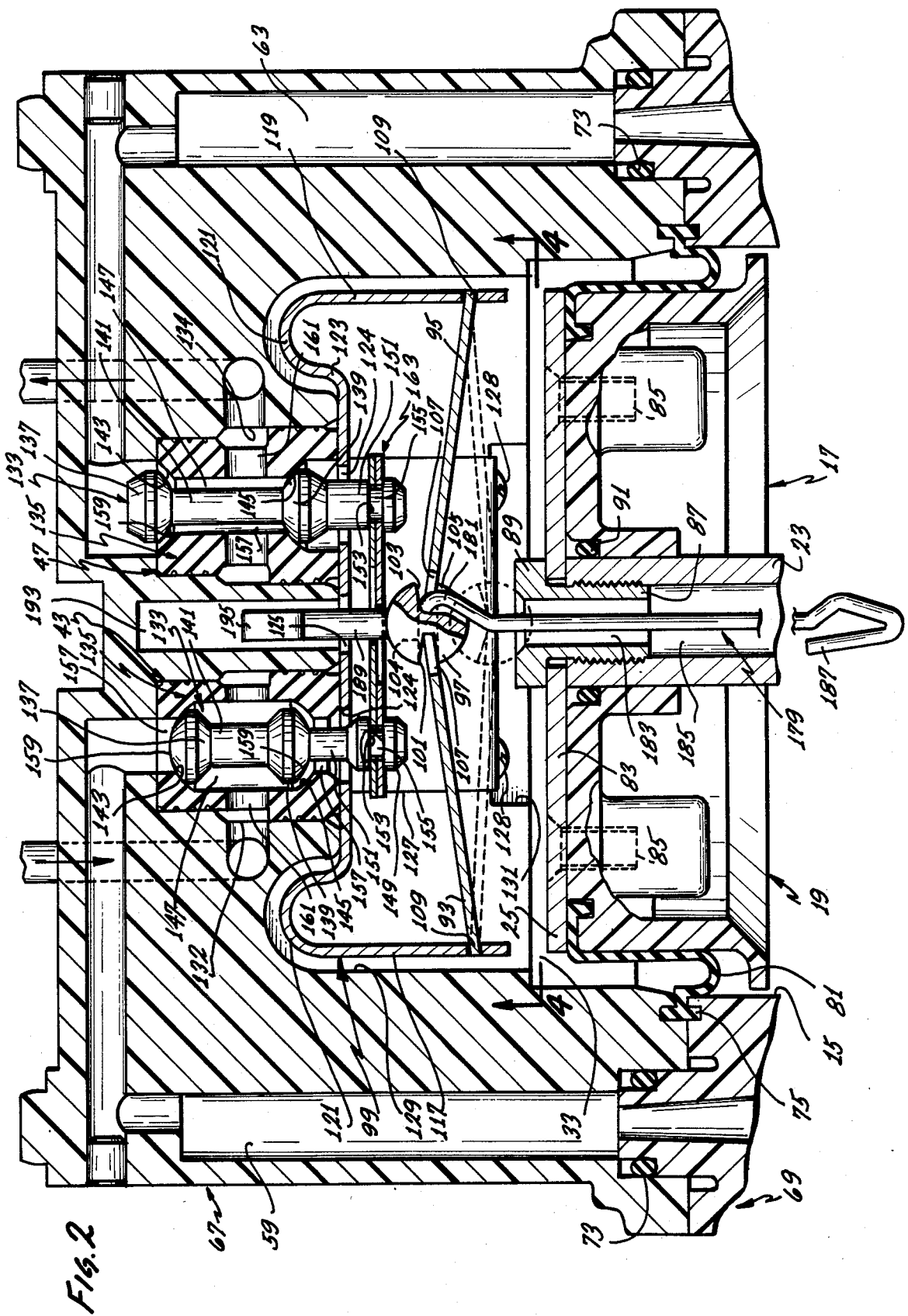
FIG. 2 is a fragmentary, longitudinal sectional view through one end portion of the reciprocable device with the piston moving down. The bistable spring means is shown in one of its states in solid lines and in the other of its states in dashed lines.

Turning now to FIG. 2, the housing 13 comprises housing sections 67 and 69 appropriately joined together and sealed by seals 73 and 75. The housing section 69 forms a main body for the housing. The housing section 67 forms an end wall for the housing.

The piston sections 17 and 19 are sealed to the wall of the cylinder 15 by diaphragms 81 having the seals 75 integral therewith as shown in FIG. 2. The diaphragm 81 is retained on the piston section 19 by a plate 83 which is attached to the piston section by one or more fasteners 85 and attached to the rod 23 by a screw 87 having a head 89. An annular seal 91 seals the piston section 19 to the rod 23.

In this embodiment, bistable spring means comprises identical levers 93 and 95, a hinge member in the form of a pin 97 and a spring 99 in the form of a spring bracket. The hinge member 97 has recesses 101 and 103 (FIGS. 2 and 3) extending longitudinally thereof and a centrally located passage 104 and an adjoining groove 105. Each of the recesses 101 and 103 progressively widens as it extends radially toward the periphery of the hinge pin 97, and this allows each of the levers to pivot about a pivot axis at the inner end of the associated recess.

The lever 93, which may be constructed of stainless steel, has a recess 107 opening at its inner end and a tab 109 at its outer end. The lever 95 is identical to the lever 93, and corresponding portions are designated by corresponding reference numerals.

The spring 99 (FIGS. 2 and 3) has legs 117 and 119 integrally coupled by U-sections 121 and a web 123 having valve openings 124 and a central opening 125. The legs 117 and 119 have openings 126. Mounting brackets 127 are integral with the web 123 along the opposite longitudinal edges of the web. Screws 128 extend through flange portions of the mounting brackets 127 to mount the spring 99 on the housing 13.

Figure 3:
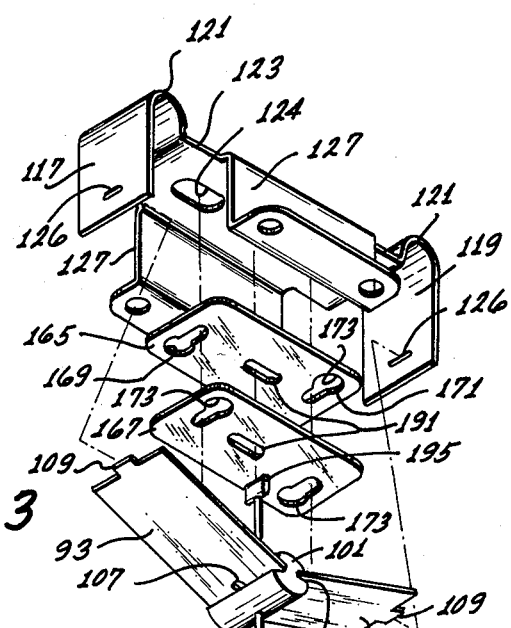
FIG. 3 is an exploded isometric view of the bistable spring means, the connector and adjacent structure.

As shown in FIGS. 2 and 3, the inner end portions of the levers 93 and 95 are received within the recesses 101 and 103, respectively, and the tabs 109 are received in the openings 126. The recesses 107 are in alignment with the passage 104 of the hinge member 97. The legs 117 and 119 bear against the outer ends of the levers 93 and 95. Accordingly, the levers 93 and 95 are biased toward the hinge member 97 which forms a pivot axis for the levers by virtue of the progressively widening nature of each of the recesses 101 and 103. The U-sections 121 provide added resilience for the spring.

The chamber 15 in which the piston 17 moves is cylindrical and it communicates at one end of the cylindrical chamber with a generally rectangular cavity 129 (FIGS. 2 and 4), and rectangular recesses 131 open into the opposite sides of the cavity 129. The flange portions of the mounting brackets 127 are received within the recesses 131, respectively, and are attached by the screws 128 to the housing section 67 at the end of the recesses 131. This mounts the bistable spring in the cavity 129.

As shown in FIGS. 1 and 2, the supply passage section 59 and the exhaust passage sections 63 extend continuously from the driving chamber 35 through the supply valve 43 and the exhaust valve 47, respectively, to the cavity 129 which communicates with the upper (as viewed in FIGS. 1 and 2) end of the chamber 15. Thus, the valves 43 and 47 are located in the supply passage section 59 and the exhaust passage section 63, respectively. The valves 43 and 47 communicate with ports 132 and 134, respectively, which are in turn coupled to the source 45 and to any suitable location for the exhaust.

The supply valve 43 includes a movable valve element 133 and a tubular, resilient valve seat member 135. The valve element 133 has heads 137 and 139 joined by a rod 141 of reduced diameter, and the heads are engageable with annular valve seats 143 and 145, respectively, formed on the valve seat member 135 around an axial passage 147 which extends through the valve seat member. The valve element 133 also has an external head 149 coupled to the head 139 by a rod 151 of reduced diameter and having a central annular groove defining spaced shoulders 153 joined by a neck 155 of reduced diameter.

The passage 147 of the valve seat member 135 has axially spaced constricted portions 157 of lesser cross-sectional dimensions than the heads 137 and 139. However, to facilitate assembly, the valve seat member 135 is sufficiently resilient to allow the heads 137 and 139 to be forced through at least one of the constricted portions 157. For this purpose, the valve seat member 135 is preferably integrally molded of a suitable resilient material, such as Santoprene, which is a product of Monsanto and comprises rubber particles in a polypropylene matrix. A rubber-plastic composite such as this can be injection molded in a short period of time rather than the much longer period of time required to mold rubber.

The valve 143 is a poppet valve in that the heads 137 and 139 engage their seats 143 and 145 without being slidably received within these seats as in the case of a spool valve. Accordingly, the valve element 133 can be moved with essentially no sliding friction. Also, to allow the valve element 133 to properly seat against the valve seats 143 and 145, even in the presence of some misalignment, each of the heads 137 and 139 has a part-spherical valve seating surface 159, and the associated valve seats 143 and 145 are also part spherical and identical to, and concentric with, the associated seating surface 159 when the seating surface engages the valve seat. To provide communication between the port 132 and the passage 147, the peripheral wall of the valve seat member 135 has a port 161.

When the head 137 seats against the valve seat 143, the head 139 is spaced from the valve seat 145 as shown in FIG. 2. Conversely, with the head 139 seated on the valve seat 145, the head 137 is spaced from the valve seat 143. Thus, the supply valve 43 supplies fluid under pressure to either the supply passage section 59 or to the chamber 15 through the cavity 129.

The exhaust valve is similar to the supply valve 43, and portions of the exhaust valve corresponding to portions of the supply valve are designated by corresponding reference numerals. The exhaust valve 47 is identical to the supply valve 43, except as shown or described herein.

The valve element 133 of the exhaust valve is essentially identical to the valve element of the supply valve 43, except that the rod 141 is elongated, and the head 149 is eliminated such that the shoulders 153 and the neck 155 are formed on the rod 151. The valve seat member 135 of the exhaust valve 47 is essentially identical to the valve seat member of the supply valve 43, except that the valve seats 143 and 145 are formed on outwardly facing portions of the passage 147, there is only one constricted portion 157 of the passage 147, and the constricted portion lies intermediate the valve seats.

With the head 139 of the exhaust valve 47 engaging the associated seat 145, the head 137 is spaced from its valve seat 143 to provide communication from the exhaust passage section 63 to the exhaust port 134. Conversely, with the head 137 seated against the valve seat 143 of the exhaust valve 47, the head 139 is spaced from the valve seat 145 to exhaust fluid from the driving chamber 33 through the cavity 129 to the exhaust port 134.

With this construction, the valve elements 133 are mounted for movement along laterally or radially spaced, essentially parallel paths. To drivingly couple the valve elements 133 to the bistable spring means, a connector 163 extends between and joins the valve elements. As shown in FIG. 2, the rods 151 project through the openings 124 in the spring 99 into the space between the brackets 127 in the cavity 129. The valve elements 133 and the piston 17 move generally axially, and the connector 163 extends transverse to the paths of movement of the valve elements. Preferably, the connector is coupled to at least one of the valve elements 133 with some looseness to compensate for misalignment and any tendency of one of the valve elements 133 to seat before the other of the valve elements. In the embodiment illustrated, the connector 163 is somewhat loosely coupled to both of the valve elements 133.

Although the connector 163 can take different forms, it preferably comprises two plate-like members 165 and 167 which can be coupled to the valve elements 133 without the aid of separate fasteners. In addition, use of a system of stacked plate-like members is useful in absorbing shock loading to which the connector may be subjected in use. The plates 165 and 167 are identical, which facilitates manufacture, and corresponding portions are designated by corresponding reference numerals. Thus, the plate 165 has openings 169 and 171 with each of the openings comprising a large diameter portion 173 and a small diameter portion 175 interconnected by a short, straight portion 177. The large diameter portion 173 is large enough to have the head 149 and the shoulders 153 pass through it, and the small diameter portion 175 is of slightly larger diameter than the neck 155. With this construction, both of the plates 165 and 167 can receive the lower end portions of the valve elements 133 such that both of the plates lie between the shoulders 153. By oppositely arranging the plate-like members 165 and 167, as shown in FIG. 3, and by moving both of these plates transversely to the axis of the valve element to align the peripheries of the plates, the small diameter portions 175 are caused to cooperate to snugly encircle the necks 155. With the plate-like members 165 and 167 oppositely arranged, the large-diameter portions 173 of each of the members 165 and 167 are in registry with unperforated portions of the other of the members 165 and 167, and only the small-diameter portions 175 are in approximate registry.

Figure 4:
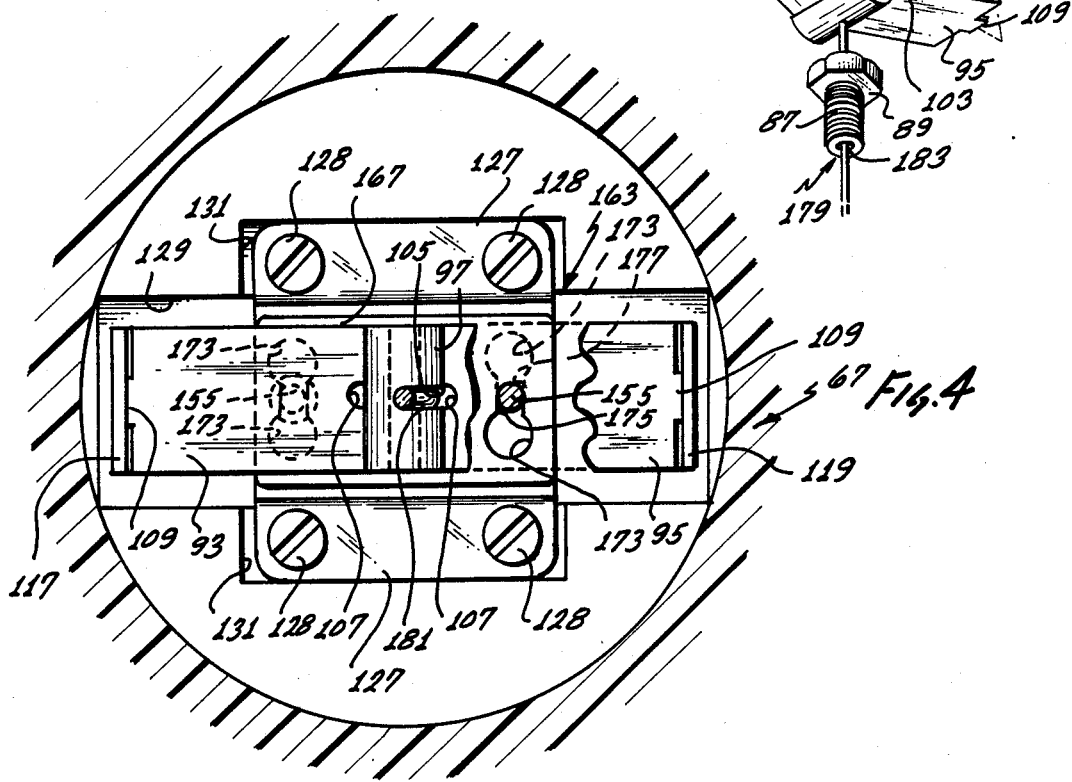
FIG. 4 is a fragmentary sectional view taken generally along line 4—4 of FIG. 2.

When the subassembly of the two valve elements 133 and the connector 163 are assembled into the spring 99, the plate-like members 165 and 167 are confined against lateral movement in the up-down direction as viewed in FIG. 4 by the mounting brackets 127. Thus, lateral retrograde movement of the type which would allow the plate-like members 165 and 167 to separate from the valve elements 133 is not permitted, and the connector 163 is attached to both of the valve elements without the aid of separate fasteners.

Means is provided for drivingly coupling the piston 17 and the bistable spring means so that the piston can move the bistable spring means from each of its states toward the other. Such means includes the screw 87 which may be considered as part of the piston 17 and which is engageable with the hinge member 97 to push the hinge member up toward and through the neutral position of the bistable spring means in which the levers are essentially coplanar. Once through the neutral position, the resilience of the spring 99 forces the levers 93 and 95 and the hinge member 97 to the other of its states shown in full lines in FIG. 2.

For moving the bistable spring means in the other direction, a wire-like coupling member 179 is provided. The coupling member 179 has a hook section 181 which is received within the passage 104 and the recess 105 of the hinge member 97. The coupling member 179 extends through a bore 183 of the screw 87 and into a bore 185 of the rod 23. The coupling member 179 has a resilient hook 187 at its other end which is of larger cross-sectional dimensions than the bore 183 but which is resilient to allow the hook 187 to be inserted through the bore 183 into the bore 185. As the piston 17 moves downwardly, the lower end of the screw 87 engages the hook 187 to pull the coupling member 179 and the hinge member 97 downwardly through the neutral position so that the resilience of the spring 99 will cause the levers 93 and 95 and the hinge member 97 to snap to the other of the states of the bistable spring means.

A coupling member 189 is coupled to the hinge member 97 and projects upwardly through aligned openings 191 in the plate-like members 165 and 167 and through the opening 125 of the spring 99 into an extension 193 of the cavity 129. The coupling member has an enlargement 195 on the end thereof remote from the hinge member 97 for engagement with the connector 163 to move the connector and the valve elements 133 downwardly as shown in FIG. 2.

With the valve elements 133 in the position shown in FIG. 2 and with the bistable spring means in the full-line position shown in FIG. 2, driving fluid under pressure is supplied from the source 45 through the supply valve 43 and the cavity 129 to the driving face 25 to push the piston 17 downwardly. The driving face 27 is vented via the exhaust passage 63 and the exhaust valve 47. As the piston 17 nears the bottom of its stroke, the lower end of the screw 87 engages the hook 187 to pull the hook and the hinge member 97 downwardly against the biasing force of the spring 99. The levers 93 and 95 are pulled through a neutral position in which they are essentially coplanar, and as soon as they move through neutral, the resilience of the spring 99 rapidly forces the hinge member 97 to the other of the states of the bistable spring means which is shown in dashed lines in FIG. 2. Shortly after the hinge member 97 passes through neutral, the enlargement 195 engages the connector 163 to pull the connector and the valve elements 133 downwardly to bring the head 139 of the supply valve 43 into engagement with the seat 145 and to bring the head 137 of the exhaust valve 47 into engagement with the valve seat 143. With the valves 43 and 45 switched in this manner, driving fluid under pressure is supplied to the face 27, and the face 25 is coupled to exhaust. Accordingly, the piston 17 moves upwardly.

As the piston 17 nears the upper end of its stroke, the head 89 of the screw 87 engages the hinge member 97 as shown in dashed lines in FIG. 2 to push the hinge member through neutral or center. The resilience of the spring 99 again rapidly and forceably pushes the hinge member 97 to the other of its states shown in full lines in FIG. 2. The hinge member 97 after it has passed through neutral engages the underside of the connector 163 to push the connector 163 and the valve elements 133 upwardly to the position shown in full lines in FIG. 2.

Although an exemplary embodiment of the invention has been shown and described, many changes, modifications and substitutions may be made by one having ordinary skill in the art without necessarily departing from the spirit and scope of this invention.

We claim:
1. A reciprocable device comprising:
a housing having a chamber therein;
a reciprocable member in the chamber and having first and second faces exposable to a driving fluid under pressure to reciprocate the reciprocable member in the chamber;
valve means in said housing including first and second valve elements movable in the same general direction along laterally spaced paths for controlling the supply and exhaust of the driving fluid under pressure to and from the first and second faces whereby the reciprocable member can be reciprocated in said chamber;
a connector extending between and joining the valve elements whereby the connector and valve elements are movable together;
bistable spring means in said housing having first and second states and a neutral position for driving the connector whereby the valve elements are moved to control the supply and exhaust of the driving fluid under pressure to and from the first and second faces, said bistable spring means including first and second levers, a hinge member between said levers and spring means for urging the first and second levers toward the hinge member;
said spring means including a spring bracket having first and second legs drivingly coupled to the first and second levers, respectively, and a web joining said legs, said connector being between the hinge member and at least a portion of said web; and
means for drivingly coupling the reciprocable member and the bistable spring means so that said reciprocable member can operate the bistable spring means.

2. A reciprocable device as defined in claim 1 wherein said valve means includes first and second valve seats against which the first and second valve elements can seat, respectively, and said connector is coupled to at least one of the valve elements with some looseness to facilitate proper seating of the first and second valve elements against their respective valve seats.

3. A reciprocable device as defined in claim 1 wherein said connector extends generally transverse to said paths.

4. A reciprocable device as defined in claim 1 wherein each of said first and second valve elements has spaced shoulders joined by a neck of reduced cross section and said connector comprises first and second adjacent plate-like members each having first and second openings sized and arranged to receive the necks of said first and second valve elements and interlock with said shoulders whereby the connector can be coupled to the valve elements.

5. A reciprocable device as defined in claim 4 including generally opposed walls adjacent one end of said chamber for preventing separation of the first and second plate-like members in at least one direction.

6. A reciprocable device as defined in claim 1 wherein said hinge member drives the connector in at least one direction.

7. A reciprocable device as defined in claim 1 wherein said valve means includes an integrally molded, tubular, resilient member having a passage extending therethrough and defining first and second generally annular valve seats within said passage, said passage having at least one constricted portion of lesser cross-sectional dimensions than either of said heads, said tubular member being sufficiently resilient to allow at least one of said heads to be forced through said constricted portion.

8. A reciprocable device as defined in claim 1 wherein the valve means includes a valve seat for the first valve element and the first valve element has a valve surface for engaging the valve seat, said valve seat and valve surface are part spherical, have essentially the same radius and are essentially concentric when the valve surface engages the valve seat.

9. A reciprocable device as defined in claim 1 wherein the connector comprises a plurality of stacked plates.

10. A reciprocable device comprising:
wall means defining a chamber;
a reciprocable member in the chamber and having first and second faces exposable to a driving fluid under pressure to reciprocate the reciprocable member in the chamber;
valve means including first and second movable valve elements for controlling the supply and exhaust of the driving fluid under pressure to and from the first and second faces whereby the reciprocable member can be reciprocated in said chamber;
a connector for drivingly coupling the first and second valve elements whereby the connector and the valve elements are movable together;
bistable spring means having first and second states and a neutral position between said states thereof for at least assisting in driving the connector, said bistable spring means including first and second levers, a movable hinge member between said levers and spring means for urging the first and second levers toward the hinge member, said hinge member being interposed between the connector and the reciprocable member and engaging the connector to drive the connector in at least one direction;
means for drivingly coupling the reciprocable member and the bistable spring means so that said reciprocable member can move the bistable spring means from one of its states through the neutral position with the resilience of the bistable spring means at least assisting in moving the bistable spring means from the neutral position toward the other state thereof; and
first means for drivingly coupling the bistable spring means and the connector whereby movement of the bistable spring means to said other state drives the first and second valve elements.

11. A reciprocable device as defined in claim 10 wherein said first means includes an aperture in said connector and a coupling member drivingly coupled to the hinge member and extending through the aperture, said coupling member has an enlargement on the side thereof remote from the hinge member for engagement with the connector to move the connector in at least one direction.

12. A reciprocable device as defined in claim 10 wherein said valve means includes first and second valve seats against which the first and second valve elements can seat, respectively, and said connector is coupled to at least one of the valve elements with some looseness to facilitate proper seating of the first and second valve elements against their respective valve seats.

13. A reciprocable device as defined in claim 10 wherein each of said first and second valve elements has spaced shoulders joined by a neck of reduced cross section and said connector comprises first and second plate-like members each having first and second openings, each of said openings has a large cross section portion sized to allow the shoulders of one of the valve elements to pass therethrough and a small cross-section portion sized to receive the neck of one of the valve elements, said plate-like members being oppositely arranged whereby the small cross-section portions cooperate to receive the necks of said first and second valve elements and interlock with said shoulders and means for preventing separation of the plate-like members whereby the connector can be coupled to the valve elements without using separate fasteners.

14. A reciprocable device as defined in claim 10 wherein said means for drivingly coupling the reciprocable member and the bistable spring means includes a passage in said hinge member and a coupling member having a portion received in said passage of said hinge member and being drivable in at least one direction by said reciprocable member.

15. A reciprocable device as defined in claim 11 wherein said valve means includes first and second valve seats against which the first and second valve elements can seat, respectively, and said connector is coupled to at least one of the valve elements with some looseness to facilitate proper seating of the first and second valve elements against their respective valve seats, each of said first and second valve elements has spaced shoulders joined by a neck of reduced cross section and said connector comprises first and second plate-like members each having first and second openings sized and arranged to receive the necks of said first and second valve elements and interlock with said shoulders whereby the connector can be coupled to the valve elements.

16. A reciprocable device as defined in claim 10 wherein said spring means includes a spring bracket having first and second legs drivingly coupled to the first and second levers, respectively, and a web joining said legs, said connector being between the hinge member and at least a portion of said web.

17. A reciprocable device as defined in claim 1 wherein said hinge member is movable relative to the connector.

18. A reciprocable device as defined in claim 17 wherein the connector is between said levers and said portion of said web.

19. A reciprocable device as defined in claim 1 wherein said valve elements extend through said web.

20. A reciprocable device as defined in claim 10 wherein the valve elements and the bistable spring means are both adjacent the same end of the chamber.

* * * * *